United States Patent
Spears et al.

(10) Patent No.: US 10,542,291 B2
(45) Date of Patent: *Jan. 21, 2020

(54) ADAPTIVE NOISE REDUCTION ENGINE FOR STREAMING VIDEO

(71) Applicant: Microsoft Technology Licensing, LLC, Redmond, WA (US)

(72) Inventors: Stacey Spears, Sammamish, WA (US); Haoyun Wu, Sammamish, WA (US); Wenbo Zhang, Redmond, WA (US); Sudhakar Prabhu, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/904,049

(22) Filed: Feb. 23, 2018

(65) Prior Publication Data

US 2018/0184129 A1 Jun. 28, 2018

Related U.S. Application Data

(63) Continuation of application No. 13/749,027, filed on Jan. 24, 2013, now Pat. No. 9,924,200.

(51) Int. Cl.
*H04N 19/86* (2014.01)
*H04N 21/44* (2011.01)
(Continued)

(52) U.S. Cl.
CPC .......... *H04N 19/86* (2014.11); *H04N 19/117* (2014.11); *H04N 19/136* (2014.11);
(Continued)

(58) Field of Classification Search
None
See application file for complete search history.

(56) References Cited

U.S. PATENT DOCUMENTS

| 4,613,905 A * | 9/1986 | Ichinoi | H04N 5/21 348/618 |
| 5,787,203 A | 7/1998 | Lee et al. | |

(Continued)

FOREIGN PATENT DOCUMENTS

| CN | 101325718 A | 12/2008 |
| CN | 101924890 A | 12/2010 |

(Continued)

OTHER PUBLICATIONS

"Qdeo Video Processing", Retrieved From: https://web.archive.org/web/20110718230955/http://www.marvell.com/digital-entertainment/assets/qdeo_extended_technology_brief.pdf, Jul. 18, 2011, 7 Pages.

(Continued)

*Primary Examiner* — Mohammad J Rahman
(74) *Attorney, Agent, or Firm* — Alleman Hall Creasman & Tuttle LLP

(57) ABSTRACT

An adaptive video noise reduction (AVNR) engine reduces noise in streaming video. The engine reads embedded information in the streaming video describing attributes of the video, such as bit rate, frame rate, resolution, content type and quality of the streaming video. The information may be included in a manifest of the streaming video. Based on the video attributes, the engine outputs one or more input values to applications that reduce noise of the streaming video. The one or more applications may reduce mosquito, block, temporal, random and banding noise of the video in response to the input values from the engine.

17 Claims, 10 Drawing Sheets

(51) Int. Cl.
  *H04N 19/61* (2014.01)
  *H04N 19/172* (2014.01)
  *H04N 19/136* (2014.01)
  *H04N 19/154* (2014.01)
  *H04N 21/2343* (2011.01)
  *H04N 19/117* (2014.01)
  *H04N 19/146* (2014.01)
  *H04N 21/84* (2011.01)
  *H04N 21/845* (2011.01)

(52) U.S. Cl.
  CPC ......... *H04N 19/146* (2014.11); *H04N 19/154* (2014.11); *H04N 19/172* (2014.11); *H04N 19/61* (2014.11); *H04N 21/23439* (2013.01); *H04N 21/44* (2013.01); *H04N 21/84* (2013.01); *H04N 21/8456* (2013.01)

(56) References Cited

U.S. PATENT DOCUMENTS

| | | | |
|---|---|---|---|
| 5,852,475 | A | 12/1998 | Gupta et al. |
| 6,621,979 | B1 | 9/2003 | Eerenberg et al. |
| 6,904,096 | B2 | 6/2005 | Kobayashi et al. |
| 6,965,645 | B2 | 11/2005 | Zhang et al. |
| 7,343,289 | B2 | 3/2008 | Cutler et al. |
| 7,375,760 | B2 | 5/2008 | Kempf et al. |
| 8,160,161 | B2 | 4/2012 | Chen |
| 8,194,757 | B2 | 6/2012 | Schoner |
| 8,238,424 | B2 | 8/2012 | Chang et al. |
| 8,411,753 | B2* | 4/2013 | Cha .................. H04N 19/34 375/240.01 |
| 8,687,123 | B2* | 4/2014 | Van Heesch ............. H04N 5/21 348/441 |
| 8,731,062 | B2 | 5/2014 | Kanumuri et al. |
| 8,750,390 | B2 | 6/2014 | Sun et al. |
| 8,885,706 | B2* | 11/2014 | Bankoski ................ G06T 5/002 375/240.01 |
| 9,924,200 | B2* | 3/2018 | Spears .................. H04N 19/86 |
| 2001/0017887 | A1* | 8/2001 | Furukawa ............ H04N 19/139 375/240.03 |
| 2002/0009146 | A1 | 1/2002 | Hall et al. |
| 2005/0094035 | A1* | 5/2005 | Babonneau ............. H04N 5/21 348/607 |
| 2005/0128356 | A1* | 6/2005 | Babonneau ............. H04N 5/21 348/607 |
| 2005/0129330 | A1 | 6/2005 | Shyshkin |
| 2005/0157796 | A1* | 7/2005 | Suzuki .................. H04N 19/86 375/240.24 |
| 2005/0265446 | A1* | 12/2005 | Yankilevich .......... H04N 19/176 375/240.03 |
| 2006/0120283 | A1* | 6/2006 | Poetker ............ H04L 29/06027 370/230 |
| 2006/0136981 | A1 | 6/2006 | Loukianov |
| 2006/0222181 | A1* | 10/2006 | Wu .......................... H04L 9/00 380/268 |
| 2006/0268980 | A1* | 11/2006 | Le Dinh .............. H04N 17/004 375/240.01 |
| 2007/0040943 | A1 | 2/2007 | Namioka |
| 2007/0058080 | A1* | 3/2007 | Son ........................ H04N 5/21 348/565 |
| 2007/0263070 | A1* | 11/2007 | Harris .................. H04W 36/02 348/14.02 |
| 2008/0144960 | A1* | 6/2008 | Watarai .................... H04N 5/21 382/260 |
| 2008/0278631 | A1* | 11/2008 | Fukuda ................. G06T 5/002 348/607 |
| 2008/0310516 | A1 | 12/2008 | Kobayashi et al. |
| 2008/0316364 | A1 | 12/2008 | Au et al. |
| 2008/0317371 | A1 | 12/2008 | Zhang et al. |
| 2009/0027548 | A1 | 1/2009 | Winger |
| 2009/0167951 | A1* | 7/2009 | Chiu ........................ H04N 5/21 348/607 |
| 2009/0195697 | A1 | 8/2009 | Kanumuri et al. |
| 2010/0165207 | A1* | 7/2010 | Deng ...................... H04N 5/144 348/620 |
| 2010/0245672 | A1* | 9/2010 | Erdler .................. H04N 19/139 348/608 |
| 2010/0315555 | A1 | 12/2010 | Sakurai et al. |
| 2011/0007820 | A1* | 1/2011 | Yim ..................... H04N 19/159 375/240.24 |
| 2011/0037835 | A1 | 2/2011 | Morino et al. |
| 2011/0149049 | A1 | 6/2011 | Sasaki et al. |
| 2011/0213273 | A1* | 9/2011 | Telfort .................... A61B 7/003 600/586 |
| 2011/0229046 | A1 | 9/2011 | Muto |
| 2011/0299601 | A1 | 12/2011 | Lai et al. |
| 2012/0019727 | A1 | 1/2012 | Zhai et al. |
| 2012/0093433 | A1 | 4/2012 | Gupta et al. |
| 2012/0320265 | A1 | 12/2012 | Balram et al. |
| 2013/0028327 | A1* | 1/2013 | Narroschke .......... H04N 19/147 375/240.16 |
| 2013/0114687 | A1 | 5/2013 | Kim et al. |
| 2013/0128957 | A1 | 5/2013 | Bankoski et al. |
| 2013/0222535 | A1* | 8/2013 | Klein Gunnewiek .. G06T 5/002 348/43 |
| 2014/0003662 | A1* | 1/2014 | Wang ................. G06K 9/00268 382/103 |

FOREIGN PATENT DOCUMENTS

| | | |
|---|---|---|
| EP | 2375747 A1 | 10/2011 |
| WO | 2008085874 A2 | 7/2008 |

OTHER PUBLICATIONS

"Final Office Action Issued in U.S. Appl. No. 13/749,027", dated Oct. 16, 2015, 12 Pages.
"Final Office Action Issued in U.S. Appl. No. 13/749,027", dated Sep. 30, 2016, 13 Pages.
"Final Office Action Issued in U.S. Appl. No. 13/749,027", dated Aug. 10, 2017, 10 Pages.
"Non Final Office Action Issued in U.S. Appl. No. 13/749,027", dated Apr. 15, 2015, 12 Pages.
"Non Final Office Action Issued in U.S. Appl. No. 13/749,027", dated Mar. 25, 2016, 12 Pages.
"Non Final Office Action Issued in U.S. Appl. No. 13/749,027", dated Mar. 10, 2017, 7 Pages.
"International Search Report and Written Opinion Issued in PCT Patent Application No. PCT/US2014/012227", dated Apr. 7, 2014, 12 Pages.
"Second Written Opinion Issued in PCT Application No. PCT/US2014/012227", dated Dec. 5, 2014, 8 Pages.
"Office Action Issued in European Patent Application No. 14704434.1", dated Mar. 13, 2017, 7 Pages.
"First Office Action and Search Report Issued in Chinese Patent Application No. 201480006049.6", dated Aug. 2, 2017, 14 Pages.
"Second Office Action Issued in Chinese Patent Application No. 201480006049.6", dated Mar. 13, 2018, 6 Pages.
Schierl, et al., "System Layer Integration of High Efficiency Video Coding", In IEEE Transactions on Circuits and Systems for Video Technology, vol. 22, Issue 12, Dec. 1, 2012, pp. 1871-1884.

* cited by examiner

ADAPTIVE NOISE REDUCTION ENGINE FOR STREAMING VIDEO

CROSS REFERENCE TO RELATED APPLICATIONS

This application is a continuation of U.S. patent application Ser. No. 13/749,027, filed Jan. 24, 2013, the entire contents of which is hereby incorporated herein by reference for all purposes.

BACKGROUND

Streaming video often includes various types of noise, such as mosquito, block, temporal, banding and/or random noise. There are a number of methods to reduce the various types of noise in streaming video. A method to reduce noise may be enabled or disabled by a user turning on or off a particular application in a video menu of a display or computing device. Once the application is enabled, the noise reduction application typically relies on image analysis in deciding how to reduce the noise.

While an application to reduce noise can improve the quality of steaming video, the method can also degrade quality of the video by smoothing out details in the images. This can happen when the application confuses detail for noise, which is typical in some applications to reduce noise. For example, noise reduction applications used on streaming videos having high bit rates typically degrade the images by smoothing out details.

SUMMARY

An adaptive video noise reduction (AVNR) engine reduces noise in streaming video. The engine reads embedded information in the streaming video describing attributes of the streaming video, such as bit rate, frame rate, resolution, content type and quality. The information may be included in a manifest of the streaming video. Based on the attributes of the streaming video, the engine outputs one or more input values to applications that reduce noise of the streaming video. The one or more applications may reduce mosquito, block, temporal, random and banding noise of the streaming video in response to the input values from the engine.

A method embodiment includes receiving a plurality of bits representing a video and determining at least one attribute of the video from a value that indicates the attribute in the plurality of bits. At least a first value is selected and outputted as an input to at least a first application to reduce noise in the video.

An apparatus embodiment includes one or more processor readable memory. An application is stored in the one or more processor readable memory and has processor readable instructions to reduce a first type of noise in a streaming video in response to a first input. A second application is also stored in the one or more processor readable memory and has processor readable instructions to reduce a second type of noise in the streaming video in response to a second input. An adaptive engine is also stored in the one or more processor readable memory and includes processor readable instructions, when executed by one or more processors, reads at least a first code in the streaming video that represents an attribute of the streaming video. The adaptive engine outputs the first and second inputs so the first and second applications, executed by the one or more processors, reduce a first and second type of noise in the streaming video.

In another embodiment, one or more processor readable memory include instructions which when executed cause one or more processors to perform a method to reduce noise in a streaming video. The method receives the streaming video including at least a first code and reads the first code. A determination is made for at least a first input value for a first application, having processor readable instructions, to reduce a first type of noise in the streaming video. A determination is made for at least a second input value for a second application, having processor readable instructions, to reduce a second type of noise in the streaming video. The first and second input values are output to the first and second applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The quality of streaming video is improved by varying the amount noise reduction applied to the streaming video based on information embedded in the streaming video. Types of noise reduction applications to reduce the amount of noise in the streaming video include mosquito, block, temporal, random and banding. The information embedded in the streaming video may include bitrate, resolution, content type, and quality of the streaming video.

The functionality of each noise reduction application may be improved by using the embedded information to adaptively control the strength (or amount) and/or use of a particular noise reduction application. Adjustment to the strength and/or use of a particular noise reduction application is made at predetermined fragments or chunks of the video stream. A computing device may receive different bitstreams at different bit rates after each predetermined fragment.

During steaming video playback, a computing device knows which bitstreams that are currently playing from a video streaming server that provides multiple bitstreams. A quality indicator embedded in a bitstream, which was created at the time of encode, is also available. Also embedded metadata describes the type of content being played, such as sports, drama or animation. By using this embedded information, the strength and/or use of selected noise reduction applications is adaptively adjusted. For streaming videos having lower bitrate streams, the strength of a selected noise reduction application may be increased. As lower bitrates are switched to higher bitrate streams, on predetermined fragments of the streaming video, the strength of a noise reduction application may be decreased in an embodiment. In another embodiment, noise reduction applications will be disabled when receiving video bitstreams having the highest bit rate so that image quality will not be degraded.

Figure 1:
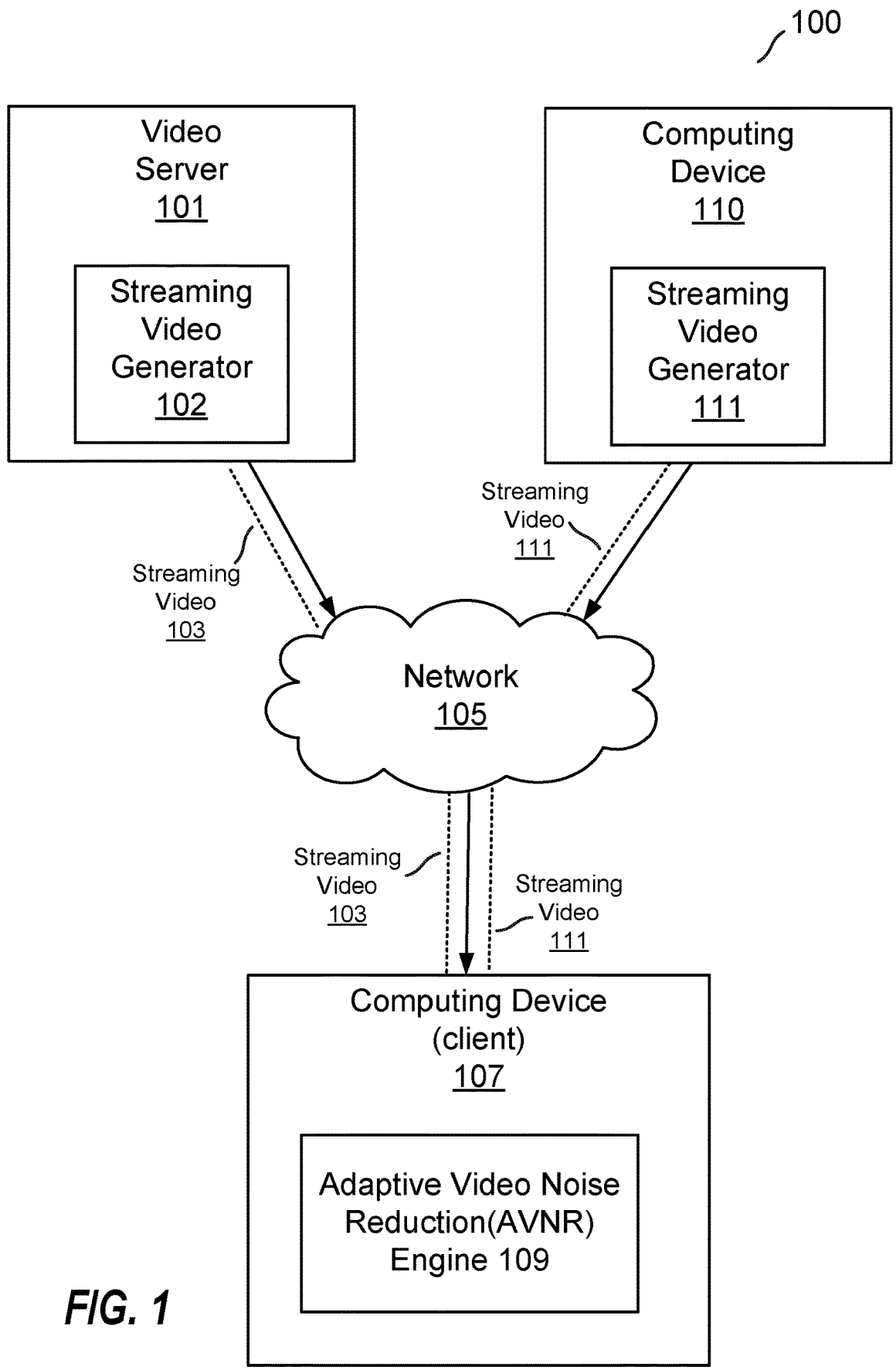
FIG. 1 is a high-level block diagram of an apparatus providing streaming video to a computing device having an adaptive video noise reduction engine.

FIG. 1 is a high-level block diagram of an apparatus 100 providing streaming video to a computing device 107 having an adaptive video noise reduction (AVNR) engine 109 that reduces noise in the received streaming video. In an embodiment, a video server 101 provides streaming media, including streaming video 103 and corresponding streaming audio, to computing device 107 that may be a client of video server 101.

Similarly, computing device 110 provides streaming media, including steaming video 111 and corresponding audio, to computing device 107. In an embodiment, computing devices 110 and 107 are peers and transfer the streaming video as such in an embodiment. In a peer-to-peer (P2P) embodiment of computing devices 107 and 110, each computing device may act as a client or a server of the other.

Also, streaming video may also be provide from a local source of computing device 107 that does not use network 105 in an embodiment.

In alternate embodiments, apparatus 100 includes many more or less computing devices and/or servers to generate and receive streaming video. In embodiments, video server 101, computing device 110 and/or computing device 107 corresponds to computing device 1800 having particular hardware components illustrated in FIG. 9 and as described herein.

In an embodiment, computing device 107 is included in a video game console and/or media console. In alternate embodiments, computing device 107 may be included in at least a cell phone, mobile device, embedded system, media console, laptop computer, desktop computer, server and/or datacenter.

Streaming media, such as streaming video and/or audio, is a plurality of bits that represents video and audio information that is transmitted over a computing network for playback by a computing device rather than downloaded for later (offline) playback in an embodiment. Streaming media may be captured, encoded and compressed for transfer and then decompressed and decoded for viewing in an embodiment. Streaming media may include embedded information or codes and metadata describing attributes of the streaming video. Streaming video attributes may include genre (or type of content), quality, frame rate, bit rate and/or resolution. The types of content included in a streaming video may include drama, sports (live action) or animation in embodiments.

Streaming videos 103 and 111 are provided to computing device 107 from streaming video generators 102 and 111 in video server 101 and computing device 110, respectively, via network 105. In an embodiment, network 105 may be the Internet, a Wide Area Network (WAN) or a Local Area Network (LAN), singly or in combination. In embodiments, computing device 107 is included in another network. Streaming videos 103 and 111 may be transferred by wire and/or wirelessly in network 105. In an embodiment, streaming video 103 and 111 are transferred using Hypertext Transfer (or Transport) Protocol (HTTP).

In an embodiment, streaming video generators 102 and 111 capture, encode and compress video into a plurality of bits that are transferred via network 105 and decoded by computing device 107. In embodiments, video may be compressed (and eventually decompressed after transmission) using different methods in embodiments. For example, Run Length Encoding (RLE), Indeo, Cinepak and Moving Pictures Expert Group (MPEG) compressing/decompression methods may be used in embodiments. In an embodiment, streaming video generators 102 and/or 111 compress video into a Moving Pictures Expert Group (MPEG) format for transfer. In a MPEG-n format, video data is compressed to form small bits that can be easily transmitted and then decompressed. MPEG achieves high compression rate by storing the changes from one frame to another, instead of each entire frame. The video information is then encoded using a Discrete Cosine Transform (DCT). MPEG uses a type of lossy compression, since some data is removed, but may cause noise in streaming video as described herein.

In an alternate embodiment, streaming video generators 102 and 111 may output video using a Society of Motion Picture and Television Engineers (SMPTE) 421M (also known as VC-1) decompression/decompression method.

Streaming media, and in particular streaming video and audio, may be transferred using different bitstreams having different bit rates (of the same video) that may be switched at fragments of the streaming video. Alternatively, streaming video may be transferred using a single bitstream having a multi-bit rate. A bitstream is a time series or sequence of bits in an embodiment. A bit rate is the number of bits that are conveyed or processed per unit of time in an embodiment.

Figure 2:
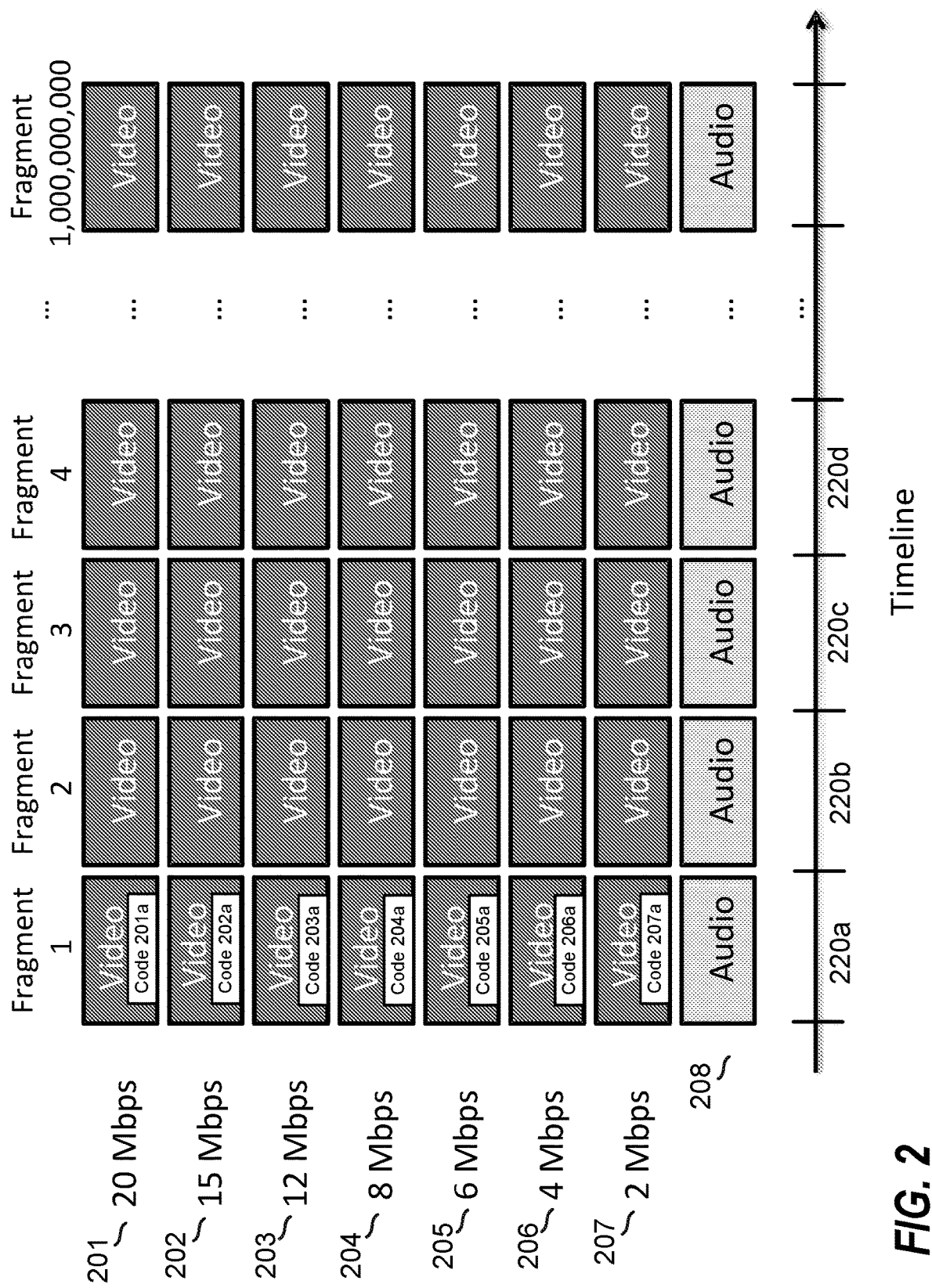
FIG. 2 illustrates a plurality of bitstreams having different bit rates.

FIG. 2 illustrates a plurality of bitstreams 201-207 having different bit rates that may be transferred, in an embodiment, by video server 101. In an embodiment, video server 101 provides a plurality of bitstreams 201-207 at various bit rates. For example, video server 101 is able to provide bitstream 201 (or a plurality of bits) at 20 Megabits per second (20 Mbps) as well as other bitstreams 202-207, each at less bit rates. Bitstream 208 is used to transfer audio information.

In embodiments, each bitstream 201-207 includes embedded information or an encoded code 201a-207a, respectively, that identifies attributes of the streaming video. In an embodiment, each bitstream 201-207 also includes embedded metadata information.

Video server 101 dynamically monitors local bandwidth and video rendering performance of a computing device 107 and optimizes content playback by switching video quality or bitstreams in real-time. Video server 101 delivers small content fragments or a predetermined amount of bits in the bitstream, as illustrated in FIG. 2, to computing device 107 and verifies that each fragment has arrived within the appropriate time and played back at the expected quality level. When one fragment doesn't meet these requirements, the next fragment delivered will be at a somewhat lower quality level or lower bit rate. Alternatively, the quality of subsequent fragments will be at a higher level or higher bit rate when conditions change. In an embodiment, each fragment is a fixed or varied interval of time worth of video. Intervals 220a-220d in FIG. 2 illustrate the interval of time worth of video that define fragments 1-4 in embodiments. In an embodiment, an interval of time is 2 seconds worth of video.

In embodiments, the same source content or video is encoded at several quality levels using a compression method. A video file for each compressed video at respective quality levels may be stored in video server 101 and used to provide the plurality of bitstreams 201-207. After video server 101 receives a request for streaming media from computing device 107, video server 101 will dynamically create cacheable virtual fragments from the video files and deliver the best possible streaming video to client computing device 107 in an embodiment.

Viewers with high bandwidth connections and modern computing devices can typically experience full HD 1080p quality streaming video, while other viewers with lower bandwidth and/or older computing devices receive an appropriate bitstream for their capabilities.

In an embodiment, computing device 107 decompresses the streaming videos 103 and/or 111 and renders the video to a display using AVRN engine 109 along with other software components and hardware. AVRN engine 109, as described herein, removes various types of noise in the displayed streaming video that may have been caused by a particular compression method or other noise source.

Figure 3:
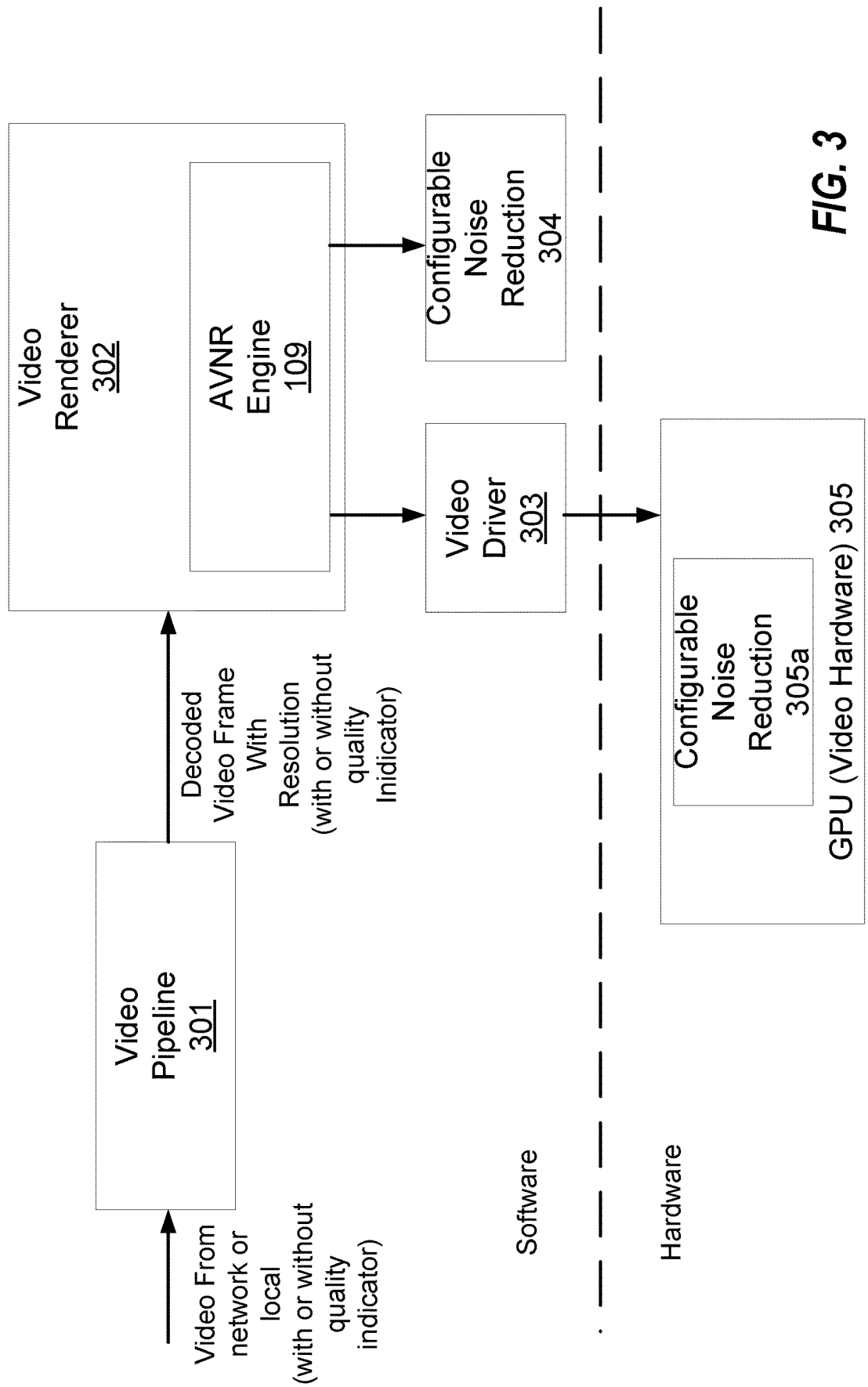
FIG. 3 illustrates a streaming video and control flow in a computing device having an adaptive video noise reduction engine.

FIG. 3 illustrates a streaming video and control flow in a computing device 107 having an AVNR engine 109, as illustrated in FIG. 1, in an embodiment. Streaming video, such as either streaming video 103 or 111, is input into video pipeline 301 from network 105. In an alternate embodiment, streaming video is stored locally on computing device 107 and input to video pipeline 310. In an embodiment, streaming video input to video pipeline 301 that may include embedded information, such as embedded code 201n shown in FIG. 2 that may or may not include a quality indicator value along with other attributes of the streaming video. In an embodiment, video pipeline 301 is one or more software components that include decoders to decompress the compressed plurality of bits that represent video and audio in streaming video.

In an embodiment, a software component may include processor/machine readable instructions when executed by one or more processors perform one or more functions. In an embodiment, a software component may include a software program, software object, software function, software subroutine, software method, software instance, script or a code fragment, singly or in combination. In an embodiment, an application or application software program may include one or more software components. In an embodiment, an application uses the services of a computing device's operating system and/or other supporting applications.

Video pipeline 301 also includes software components to process or transform the decoded streaming video into a video frame with a particular resolution to a video renderer 302. The video frame may be stored in a video file passed to video renderer 302. In embodiments, video pipeline 310 also decodes an embedded code in the streaming video and outputs information regarding attributes of the streaming video that may include a quality value, such as quality indicator value 512 illustrated in FIG. 5. In an embodiment, video pipeline 310 also decodes metadata from the streaming video and outputs the metadata information. In an embodiment, a video renderer 302 is a software component that processes a video file and sends the file sequentially to video display hardware. For example, video renderer 302 provides video frames to video hardware, such as GPU 305, via a video driver 303, so that the video display hardware may display the video on a display in a computing device. Example of video renderers include SVR, VMR-7, Enhanced Video Renderer, VMR9 Renderless and Haali's Renderer.

In an embodiment, video driver 303 is a software component that allows graphics-mode applications, such as video renderer 302, to display a video frame having a selected resolution and number of colors using GPU 305. In embodiments, an operating system may also use a video driver to provide a video frame.

Figure 4:
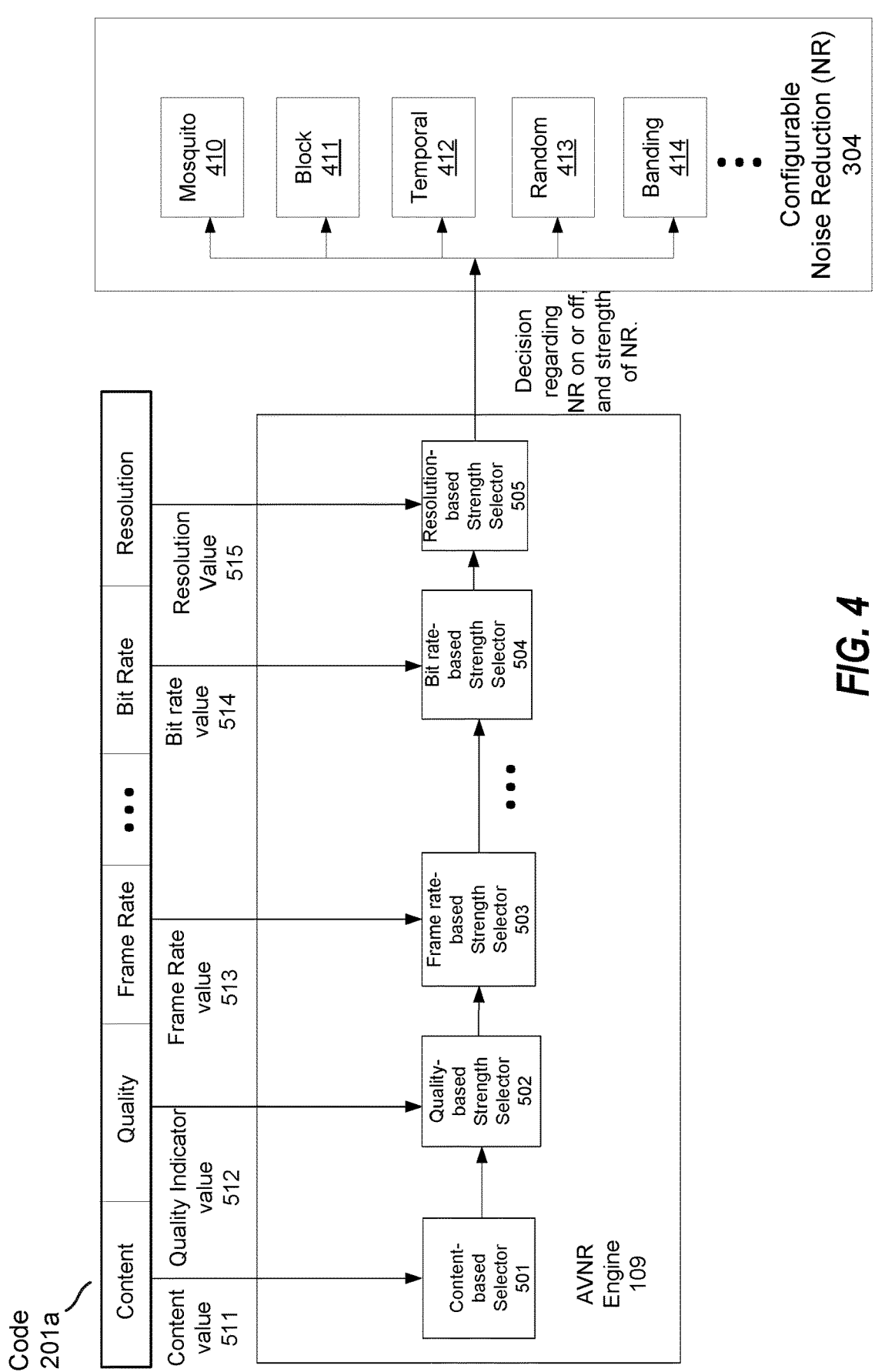
FIG. 4 is a high-level hardware block diagram of an adaptive video noise reduction engine.

In an embodiment, AVNR engine 109 is a software component included in video renderer 302 that provides one or more inputs to configurable noise reduction 304, another software component. Configurable noise reduction 304 include one or more video noise reduction applications that reduces varies types of video noise in a video frame being processed by video renderer 302. In embodiments, configurable noise reduction 304 includes mosquito 410, block 411, temporal 412, random 413 and banding 414 software components, as illustrated in FIG. 4, that each reduce video noise in a video frame in response to inputs from AVNR engine 109. In an embodiment, AVNR provides adaptive inputs to one or more of the noise reduction software components to reduce video noise in streaming video based on embedded attribute information of the streaming video.

In alternate embodiments, AVNR engine 109 and/or configurable noise reduction 304 may be implemented in a hardware device, integrated circuits and/or logic. For example, configurable noise reduction 305a in GPU 305 performs the function of configurable noise reduction 304 in an alternate embodiment. Video driver 303 provides an interface for AVNR engine 109 to use configurable noise reduction 305a. Based on inputs provided by AVNR engine 109, video driver 303 loads different noise reduction shader code and sets parameters, such as a strength for a particular type of noise reduction, in GPU 305, and in particular noise reduction 305a. Noise reduction filter code is then executed by GPU 305 in an embodiment.

FIG. 4 illustrates a high-level block diagram of AVNR engine 109 that receives attribute information regarding streaming video, such as in code 201a. AVNR engine 109 also outputs one or more adaptive inputs to noise reduction software applications in configurable noise reduction 304. In embodiments, attributes of streaming video, such as content value 511, quality indicator value 512, frame rate value 513, bit rate value 514 and resolution value 515 are retrieved from an embedded code in streaming media. In an embodiment, more or less attribute values may be retrieved from an embedded information or code. In an embodiment, one or more attribute values may be obtained from metadata of the streaming video and input into AVNR engine 109. In embodiments, one or more attribute values include multi-bit values or codes.

A quality indicator value 512 is a value assigned to streaming video during generation that indicates the quality of streaming video and may be used by AVNR engine 109.

Content value 511, quality indicator value 512, frame rate value 513, bit rate value 514 and resolution value 515 are input to content-based selector 501, quality-based strength selector 502, frame rate-based strength detector 50, bit rate-based strength selector 504 and resolution-based strength selector 505, respectively, of AVNR engine 109. In alternate embodiments, attribute values of streaming video may not be available to AVNR engine 109. When particular attribute values are not available, respective selectors use default values in the selector. In further embodiments, other attribute values and respective selectors may be used in AVNR engine 109.

In particular, a content value 511 is input to content-based selector 501 that outputs a selected content value to quality-based strength selector 502 that also receives a quality indicator value 512. Based on the quality indicator value 512 and selected content value from content-based selector 501, quality-based strength selector 502 outputs a selected quality value to frame rate-based strength selector 503. Based on the frame rate value 513 and selected quality value from quality-based strength selector 501, frame-based strength selector 503 outputs a selected frame rate value to bit rate-based strength selector 504. Based on the bit rate value 514 and selected frame rate value from frame rate-based strength selector 503, bit rate-based strength selector 504 outputs a selected bit rate value to resolution-based strength selector 505. Based on the resolution value 515 and selected bit rate value from bit rate-based strength selector 504, resolution-based strength selector 505 outputs an input value to a particular noise reduction application in configurable noise reduction 304.

In embodiments, each selector of AVNR engine 109 outputs a value to the next selector until the final selector outputs an input value for one or more noise reduction applications in configurable noise reduction 304. In embodiments, sets of selectors 501-505 are used in AVNR engine 109 of each noise reduction application in configurable noise reduction 304. For example, selectors 501-505 may be used to output an input value for mosquito 410; while, another similar set of selectors receive the same attribute values and output a different input value for block 411 that reduces a different type of video noise than the video noise reduced by mosquito 410.

In an embodiment, each selector 501-505 includes a look-up table that provide an output based on particular inputs. In an alternate embodiment, each selector operates similar to a multiplexer.

In embodiments, outputs of AVNR 109 indicate whether a particular noise reduction application in configurable noise reduction 304 is enabled (or on) to reduce a particular type of video noise and/or the amount (or strength) to be applied by the particular noise reduction application to a video frame in the streaming video. In an embodiment, an output of AVNR 109 may be a multi-bit value where a zero indicates that the particular noise reduction application is disabled and positive values within a range indicates a strength at which to apply the particular noise reduction application.

For example, sports content often contains faster motion than for example drama content. So in an embodiment in which computing device 107 is receiving sports streaming video at a relatively low bit rate, AVNR 109 may output a stronger or larger input value to a particular noise reduction application than when computing device 107 is receiving drama or a movie as streaming video at the bit rate.

Similarly, a streaming video that has a frame rate of 24 p will typically have less motion than a streaming video with 30 p or 60 p. So AVNR 109 will output a stronger or larger input value to a particular noise reduction application when receiving streaming video having a higher frame rate than receiving other streaming video at a lower frame rate in an embodiment.

Alternatively, when streaming video is received at sufficiently large bit rates, AVNR 109 may disable all or selected noise reduction applications by outputting appropriate input values to the respective noise reduction applications.

Configurable noise reduction 304 may include one or more applications to reduce different types of video noise in streaming video. In embodiments, other types of applications that for example enhance a video frame in streaming video, such as a detail enhancement application, may be included in configurable noise reduction 304 and receive inputs from AVNR 109.

Mosquito noise reduction (mosquito) 410 is an application or filter that reduces distortion or noise that appears near crisp edges of objects in a video frame of streaming video in an embodiment. Mosquito noise may appear as random aliasing near crisp edges of objects. Video may have been compressed with a discrete cosine transform (DCT) in an embodiment. The mosquito noise may occur during decompression when the decoding has to approximate the discarded data by inverting the DCT model. As display become larger, mosquito noise and other video noise may become more noticeable.

Block noise reduction (block) 411 is an application or filter that reduces mosaic-like blocks in a video frame of streaming video in an embodiment. Block noise may also be known as quilting or checker boarding. Block noise may be seen in fast motion scenes.

Temporal noise reduction (temporal) 412 is an application or filter that reduces video noise by analyzing pixels from different video frames of streaming video in an embodiment. In an embodiment, a motion compensation method may be used to remove ghosting artifacts by blending together pixels from several frames.

Random noise reduction (random) 413 is an application or filter that reduces random noise in a video frame of streaming video in an embodiment.

Banding noise reduction (banding) 414 (also known as color banding reduction) is an application or filter that corrects inaccurate color presentation in a video frame of streaming video, such as computer graphic in animation, in an embodiment. For example, in 24 bit color modes, 8 bits per channel is typically enough to render images in a full visible spectrum. However, in some cases a change between shades of the same color may be produced. For instance, displaying natural gradients (like sunsets, dawns or clear blue skies) can show minor color banding. Color banding is typically more present with relatively low bits per pixel (BPP) at 16-256 colors (4-8 BPP), where not every shade can be shown because there are insufficient bits to represent them. In embodiments, banding 414 introduces dithering and/or increases the number of bits per color channel to reduce banding noise.

Figure 6:
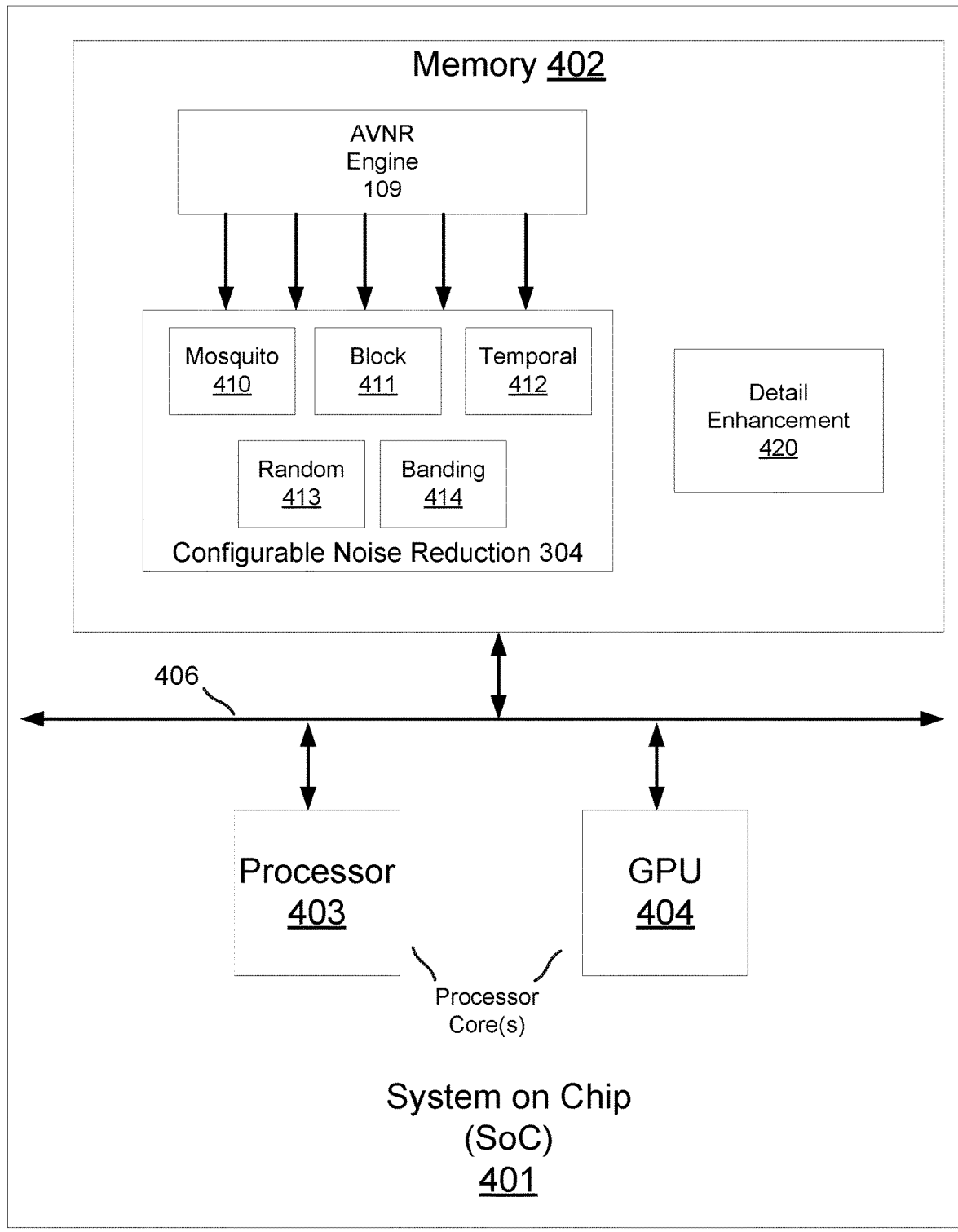
FIG. 6 is a high-level hardware block diagram of a computing device having an adaptive video noise reduction engine.

In an embodiment, a detail enhancement 420, as illustrated in FIG. 6, provides detail to a video frame being processed by video renderer 302 after one or more applications in configurable noise reduction 304 is applied to reduce noise. One or more applications in configurable noise reduction 304 may reduce noise as well as some detail in a video frame. Detail enhancement 420 includes one or more applications that attempts to add the detail to the video frame that may have been reduced or eliminated by configurable noise reduction 304.

In an embodiment, detail enhancement 420 is a software component that receives input from AVNR engine 109, such as an amount of detail enhancement to apply to a video frame. In an embodiment, an amount of detail enhancement to a video frame is based on inputs from AVNR engine 109 provided to configurable noise reduction 304. For example, when AVNR engine 109 provides inputs to configurable noise reduction 304 that indicates that a relatively large amount of noise is to be reduced, AVNR engine 109 will provide an input to detail enhancement 420 to provide a relatively large amount of detail enhancement to a video frame to compensate for the noise reduction. In an embodiment, AVNR engine 109 does not provide input to detail enhancement 304.

In an alternate embodiment, detail enhancement 304 is performed by an integrated circuit and/or hardware component, such as GPU 404.

Figure 5A:
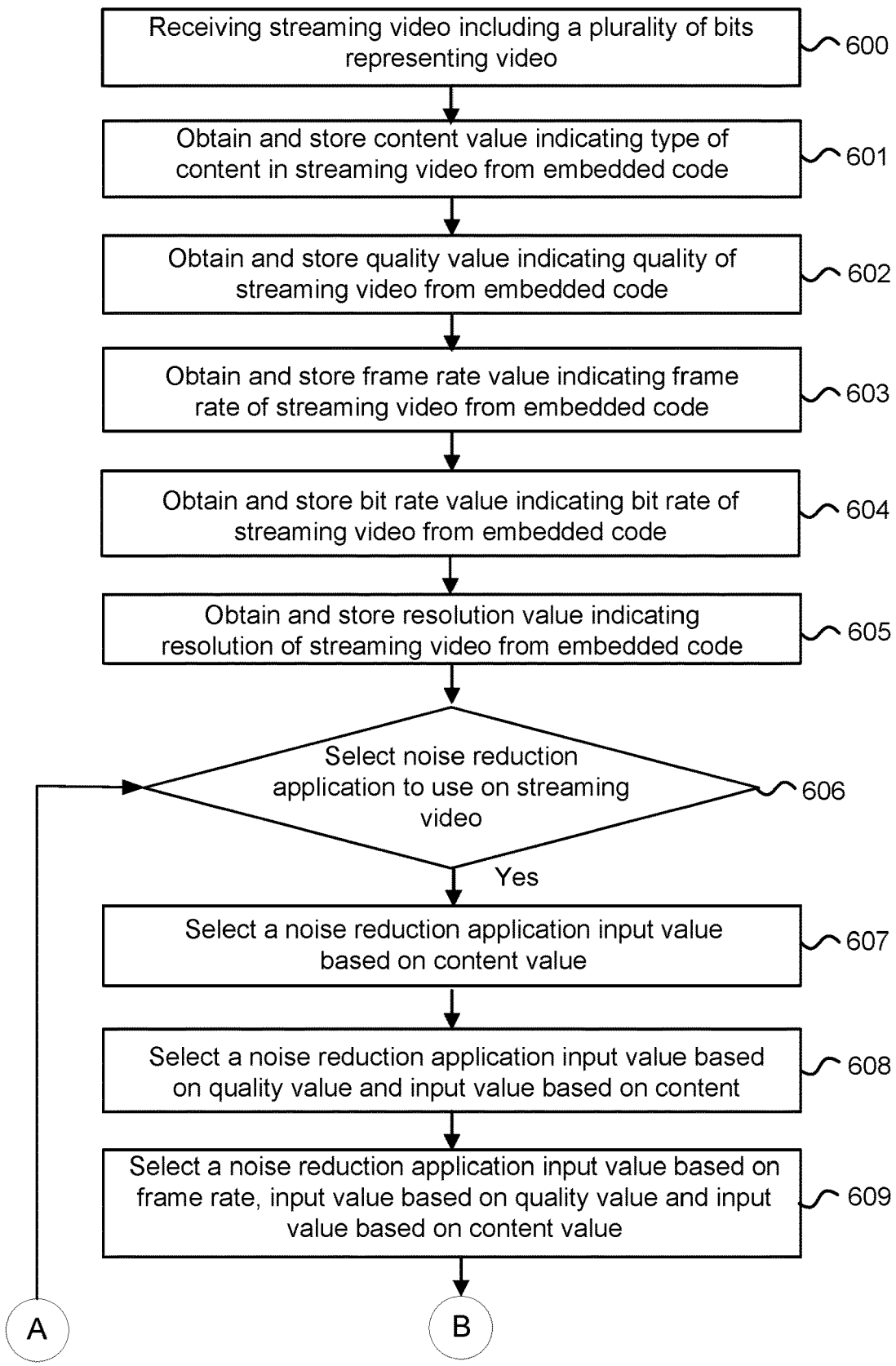
FIGS. 5A-B is a flow chart of operating an adaptive video noise reduction engine.
Figure 5B:
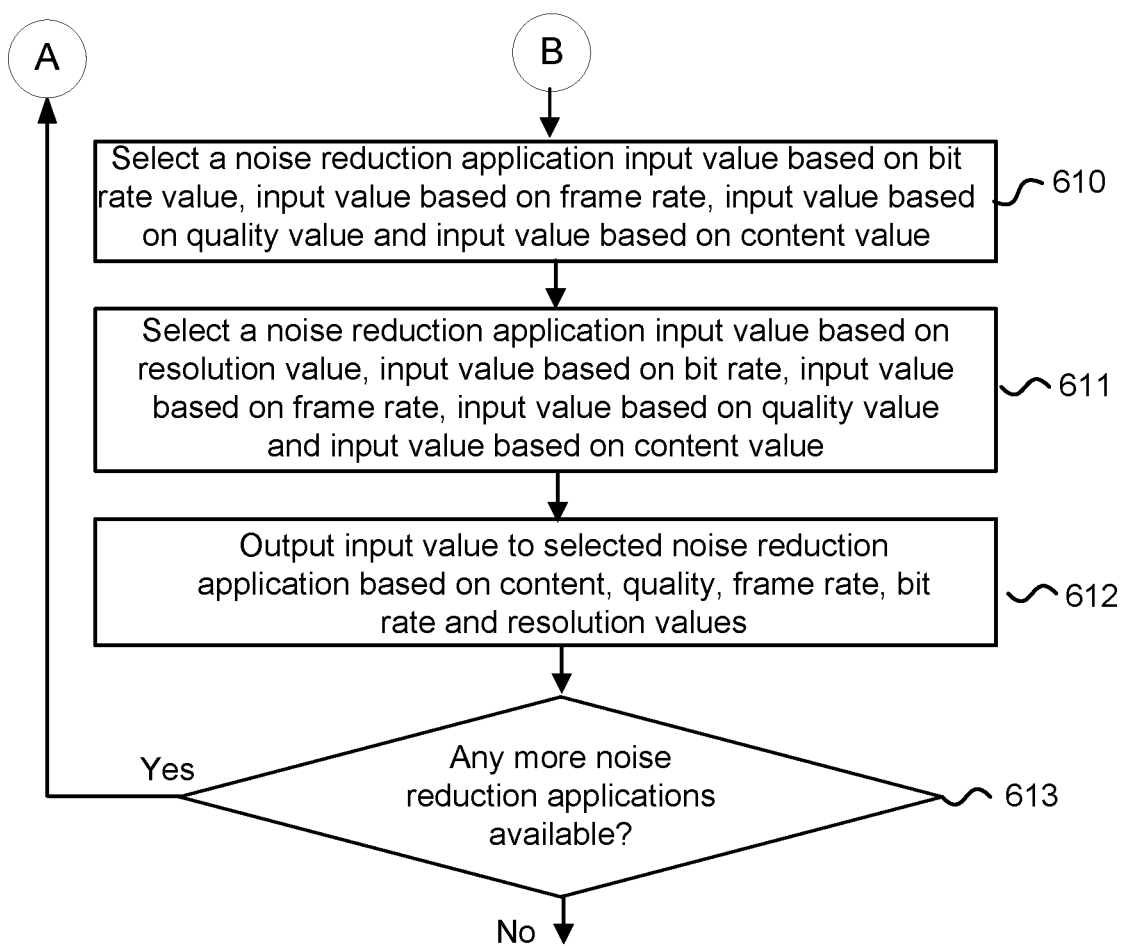

FIGS. 5A-B is a flow chart of operating an adaptive video noise reduction engine, such as AVRN 109 illustrated in FIG. 4. In embodiments, steps illustrated in FIGS. 5A-B represent the operation of hardware (e.g., processors, memories, circuits), software (e.g., operating system, applications, engines, drivers, machine/processor executable instructions), or a user, singly or in combinations. As one of ordinary skill in the art would understand, embodiments may include less or more steps shown. In various embodiments, steps illustrated may be completed sequentially, in parallel or in a different order as illustrated.

Step 600 illustrates receiving streaming video including a plurality of bits representing video. In an embodiment, the streaming video includes embedded information or a code indicating one or more attributes of the streaming video. In an embodiment, video pipeline 301 receives the streaming video. In an alternate embodiment, video renderer 302 including AVNR engine 209 receives the streaming video.

Step 601 represents obtaining a content value that indicates a type of content in a streaming video. In an embodiment, the content value is embedded as code in streaming video. In alternate embodiments, the content value may be obtained from metadata embedded in the streaming video. In an embodiment, content of the streaming media may be indicated by content value 511 as illustrated in FIG. 4. Content of the streaming media may include sports, drama, animation or other type of content. In an embodiment, the content value is stored in temporary memory before being transferred to an AVNR engine.

Step 602 represents obtaining a quality value that indicates a type of quality in a streaming video. In an embodiment, the quality value is embedded as code in streaming video and inserted during encoding of the video. In an embodiment, quality of the streaming video may be indicated by quality indicator value 512 as illustrated in FIG. 4. In an embodiment, the quality indicator value is stored in temporary memory before being transferred to an AVNR engine.

Step 603 represents obtaining a frame rate value that indicates a frame rate of a streaming video. In an embodiment, frame rate of the streaming video may be indicated by frame rate value 513 as illustrated in FIG. 4. In an embodiment, the frame rate value is stored in temporary memory before being transferred to an AVNR engine.

Step 604 represents obtaining a bit rate value that indicates a bit rate of a streaming video. In an embodiment, bit rate of the streaming video may be indicated by bit rate value 514 as illustrated in FIG. 4. In an embodiment, the bit rate value is stored in temporary memory before being transferred to an AVNR engine. In an embodiment, a bit rate value corresponds to a fragment of the streaming video and different fragments may have different bit rates.

Step 605 represents obtaining a resolution value that indicates a resolution of a streaming video. In an embodiment, resolution of the streaming video may be indicated by resolution value 515 as illustrated in FIG. 4. In an embodiment, the resolution value is stored in temporary memory before being transferred to an AVNR engine.

Step 606 illustrates selecting a noise reduction application to use on the streaming video. In an embodiment, one or more noise reduction applications in configurable noise reduction 304 as illustrated in FIG. 4 may be selected to receive an input value from an AVNR engine in response to the attribute values of the streaming video.

Step 607 illustrates selecting an input value for a selected noise reduction application in response to a content value. In an embodiment, content-based selector 501 performs this function in AVNR engine 109. When a content value is not available, a default value is selected by content-based selector 501.

Step 608 illustrates selecting an input value for a selected noise reduction application in response to a quality value and an input value based on content. In an embodiment, quality-based strength selector 502 performs this function in AVNR engine 109. When a quality indicator value is not available, a default value is selected by quality-based strength selector 502.

Step 609 illustrates selecting an input value for a selected noise reduction application in response to a frame rate value and an input value based on content and quality. In an embodiment, frame rate-based strength selector 503 performs this function in AVNR engine 109. When a frame rate value is not available, a default value is selected by frame rate-based strength selector 503.

Step 610 illustrates selecting an input value for a selected noise reduction application in response to a bit rate value and an input value based on content, quality and frame rate. In an embodiment, bit rate-based strength selector 504 performs this function in AVNR engine 109. When a bit rate value is not available, a default value is selected by bit rate-based strength selector 504.

Step 611 illustrates selecting an input value for a selected noise reduction application in response to a resolution value and an input value based on content, quality, frame rate and bit rate. In an embodiment, resolution-based strength selector 505 performs this function in AVNR engine 109. When a resolution value is not available, a default value is selected by resolution-based strength selector 505.

Step 612 illustrates outputting the input value from an AVNR engine, such as AVNR engine 109, in response to the attribute values of the streaming video. In an embodiment, resolution-based strength selector 505 outputs the input value to the selected noise reduction application. The input value may indicate a strength or an amount of noise reduction to be applied or disable the selected noise reduction application.

Step 613 illustrates determining whether any other noise reduction applications are available to be used on the streaming video. When other noise reduction applications are available control transfers back to step 606 where steps 607 through 612 may be repeated. Otherwise, operation of an engine is suspended or waits for further processing in embodiments.

In an embodiment, computing device 107 includes a SoC (a.k.a. SOC) 401 as illustrated in FIG. 6. A SoC is an integrated circuit IC that integrates components of a computing device or other electronic system into a single chip or semiconductor substrate. In an embodiment, SoC 401 includes memory 402, and processor 403, GPU 404 and signal path 406. In alternate embodiment, processor 403 and GPU 404 may be replaced with a single processor core. Alternatively, other processor cores may be included in SoC 401. In an alternate embodiment, a SoC is not used.

In embodiments, memory 402 stores AVNR 109 and configurable noise reduction 304 including mosquito 410, block 411, temporal 412, random 413 and banding 414 software components. In an embodiment, one or more of the software components stored in memory 402 may be executed or read by GPU 404 and/or processor 403 to reduce video noise in streaming video. Processor core(s) may also include a controller, central processing unit (CPU), GPU, digital signal processor (DSP) and/or a field programmable gate array (FPGA).

A GPU is typically an integrated circuit able to assist a processor, such as CPU, in performing complex rendering calculations. In an embodiment, one or more video rendering software components are also stored in memory 402 and executed by GPU 404 and/or processor 403.

As one of ordinary skill in the art would appreciate, other electronic components may also be included in SoC 401. A SoC 401 may include digital, analog, mixed-signal, and/or radio frequency circuits—one or more on a single semiconductor substrate. A SoC 401 may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, SoC 401 may be replaced with a system in package (SiP) or package on package (PoP). In a SiP, multiple chips or semiconductor substrates are housed in a single package. In a SiP embodiment, processor core(s) would be on one semiconductor substrate and memory 402 would be on a second semiconductor substrate, both housed in a single package. In an embodiment, the first semiconductor substrate would be coupled to the second semiconductor substrate by wire bonding.

In a PoP embodiment, processor core(s) would be on one semiconductor die housed in a first package and memory 402 would be on a second semiconductor die housed in a second different package. The first and second packages could then be stacked with a standard interface to route signals between the packages, in particular the dies. The stacked packages then may be coupled to a printed circuit board. In an embodiment, memory 402 is positioned on top of processor core(s).

In an embodiment, memory 402 may represent one or more processor readable memories. In an embodiment, memory 402 may be a Wide I/O DRAM. Alternatively, memory 402 may be Low Power Double Data Rate 3 dynamic random access memory (LPDDR3 DRAM) memory (also known as Low Power DDR, mobile DDR (MDDR) or mDDR). In an embodiment, memory 402 may be a combination of different types of memory.

In embodiments, memory 402 includes one or more arrays of memory cells in an IC disposed on a semiconductor substrate. In an embodiment, memory 402 is included in an integrated monolithic circuit housed in a separately packaged device than the processor core(s). In embodiments, memory 402 may include volatile and/or non-volatile memory.

Types of volatile memory include at least dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include at least types of electrically erasable program read-only memory ("EE-PROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

Figure 7:
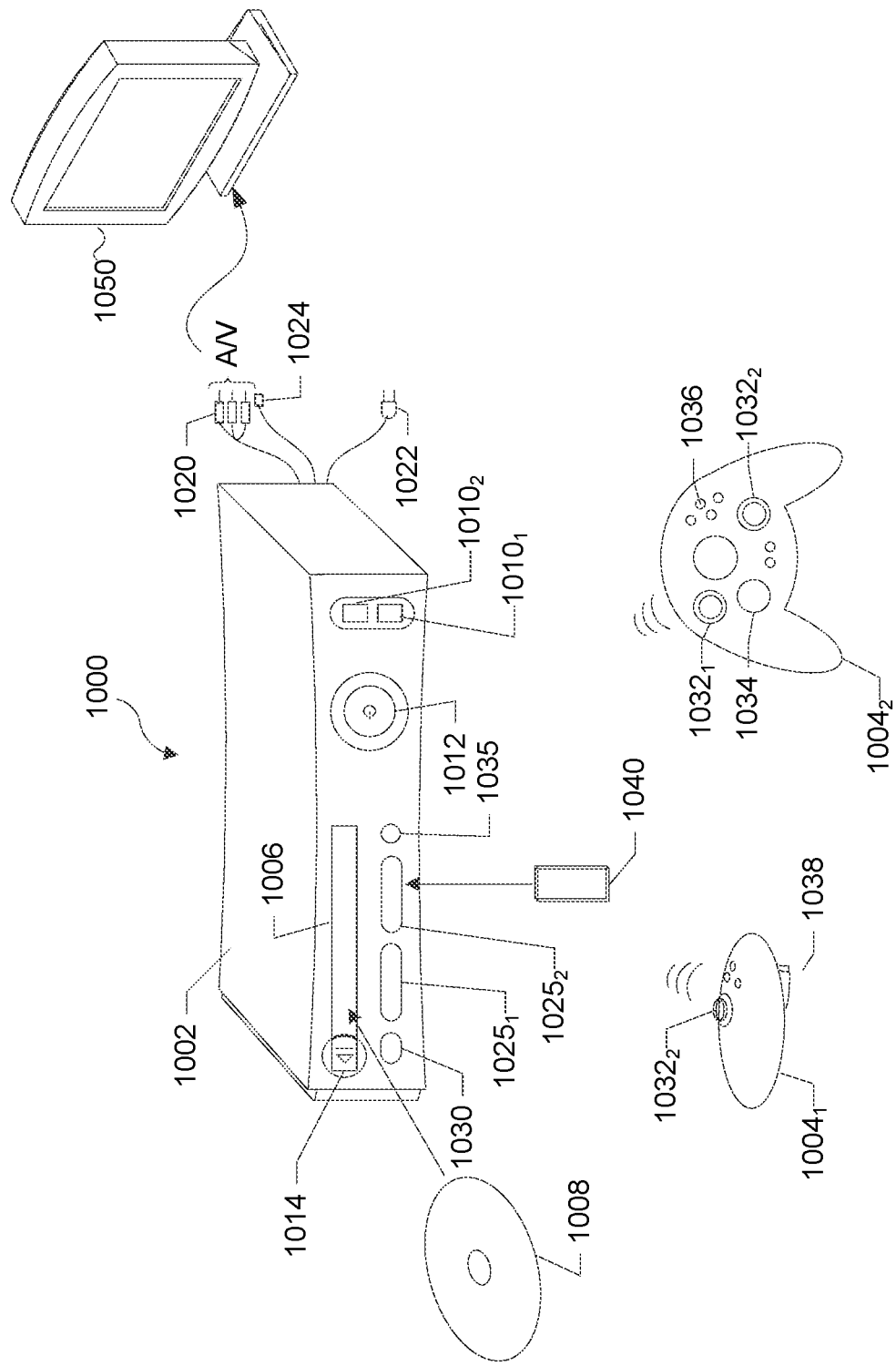
FIG. 7 is an isometric view of an exemplary gaming and media system.

In embodiments, signal path 406 (as well as other signal paths described herein) are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines to carry control and data information as well as timing information. In an alternate embodiment, a signal path includes data signal lines or control signal lines. In still other embodiments, signal paths are unidirectional (signals that travel in one direction) or bidirectional (signals that travel in two directions) or combinations of both unidirectional signal lines and In an embodiment, computing device 107 may be, but is not limited to, a video game and/or media console. FIG. 7 will now be used to describe an exemplary video game and media console, or more generally, will be used to describe an exemplary gaming and media system 1000 that includes a game and media console. The following discussion of FIG. 7 is intended to provide a brief, general description of a suitable computing device with which concepts presented herein may be implemented. It is understood that the system of FIG. 7 is by way of example only. In further examples, embodiments describe herein may be implemented using a variety of client computing devices, either via a browser application or a software application resident on and executed by a client computing device. As shown in FIG. 7, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include Blue-ray Disc (BD), DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 7, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 7, each controller 1004 is equipped with two thumb sticks 1032$_1$ and 1032$_2$, a D-pad 1034, buttons 1036, and two triggers 1038. These controllers are merely representative, and other known gaming controllers may be substituted for, or added to, those shown in FIG. 7.

In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel I/O subassembly 1142 includes a touch surface and a microphone for receiving and translating a touch or voice, such as a voice command, of a user.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games (such as video games) stored on a memory medium, as well as for downloading and playing games, and reproducing pre-recorded music and videos, from both electronic and hard media sources. With the different storage offerings, titles can be played from the hard disk drive, from an optical storage disc (e.g., 1008), from an online source, or from MU 1040. Samples of the types of media that gaming and media system 1000 is capable of playing include:

Game titles played from Blue-ray, CD and DVD discs, from the hard disk drive, or from an online streaming media source.

Digital music played from a CD in portable media drive 1006, from a file on the hard disk drive (e.g., music in a media format), or from online streaming media sources.

Digital audio/video played from a Blue-ray or DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select a game using the controller 1004 and display state solvability information as discussed below.

Figure 8:
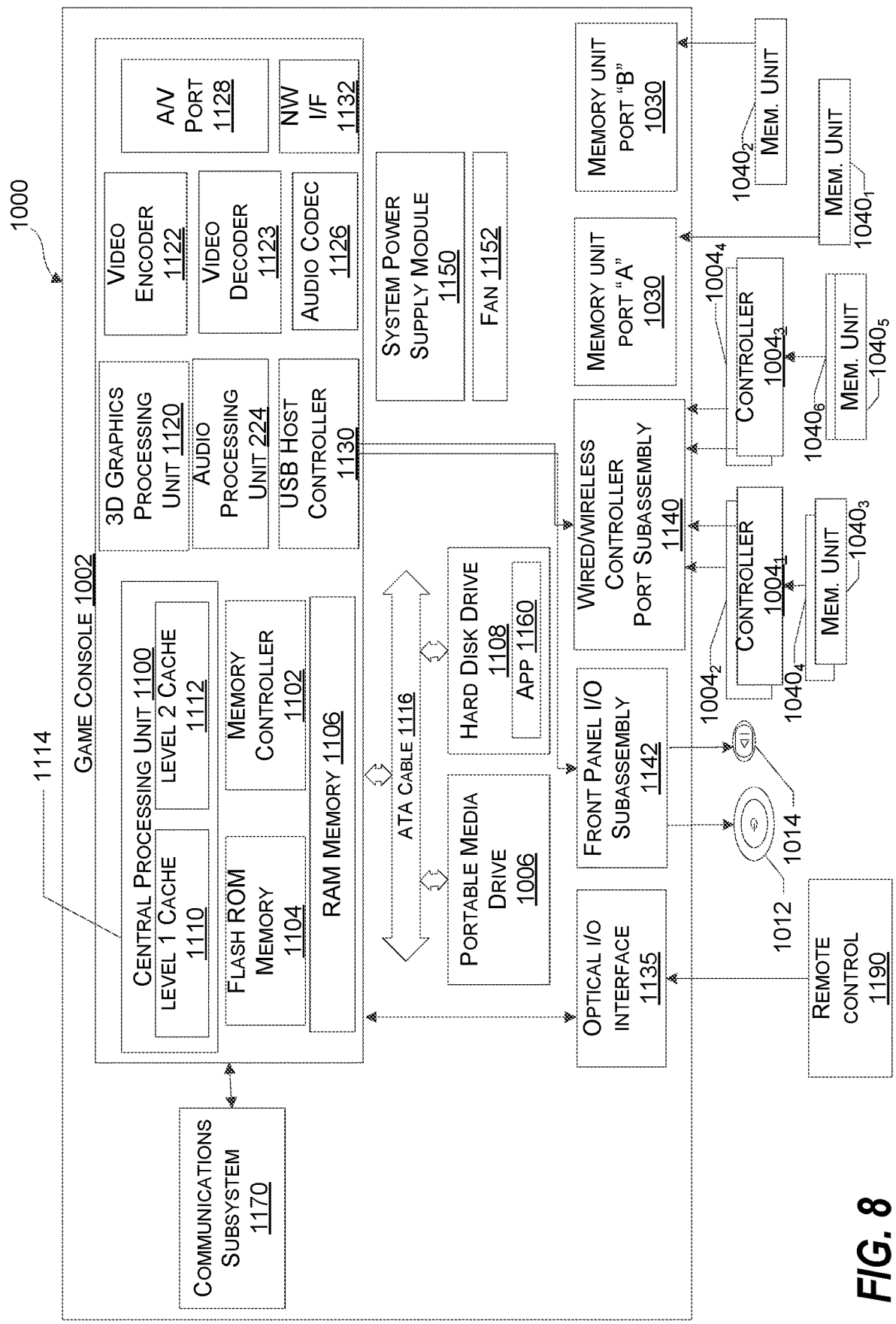
FIG. 8 is an exemplary functional block diagram of components of the gaming and media system.

FIG. 8 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive 1108, and the portable media drive 1006. In one implementation, the CPU 1100 includes a level 1 cache 1110 and a level 2 cache 1112, to temporarily store data and hence reduce the number of memory access cycles made to the hard drive 1108, thereby improving processing speed and throughput. In an embodiment, CPU 1100 and memory controller 1102 correspond to processor 403 and engine 109 while RAM 1106 corresponds to memory 102 in embodiments.

The CPU 1100, the memory controller 1102, and various memory devices are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

A three-dimensional graphics processing unit 1120 and a video encoder 1122, video decoder 1123 form a video processing pipeline for high speed and high resolution (e.g., High Definition) graphics processing. Data are carried from the graphics processing unit 1120 to the video encoder 1122 and video decoder 1123 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display. In the illustrated implementation, the video and audio processing components 1120-1128 are mounted on the module 1114.

In an embodiment, the CPU 1100, the memory controller 1102, the ROM 1104, RAM 1106 and graphics processing unit 1120 are included in a SoC, such as SoC 401 illustrated in FIG. 6.

FIG. 8 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers 1004$_1$-1004$_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 8, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs $1040_1$ and $1040_2$ are illustrated as being connectable to MU ports "A" $1030_1$ and "B" $1030_2$ respectively. Additional MUs (e.g., MUs $1040_3$-$1040_6$) are illustrated as being connectable to the controllers $1004_1$ and $1004_3$, i.e., two MUs for each controller. The controllers $1004_2$ and $1004_4$ can also be configured to receive MUs. Each MU 1040 offers additional storage on which games, game parameters, and other data may be stored. In some implementations, the other data can include any of a digital game component, an executable gaming application, an instruction set for expanding a gaming application, and a media file. When inserted into the console 1002 or a controller, the memory controller 1102 can access the MU 1040.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 7), a television, a video projector, or other display device. In this standalone mode, the gaming and media system 1000 enables one or more players to play games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of the computing device 107 discussed above with reference to FIG. 1 and various other Figures. As was explained above, there are various other types of computing devices with which embodiments described herein can be used.

Figure 9:
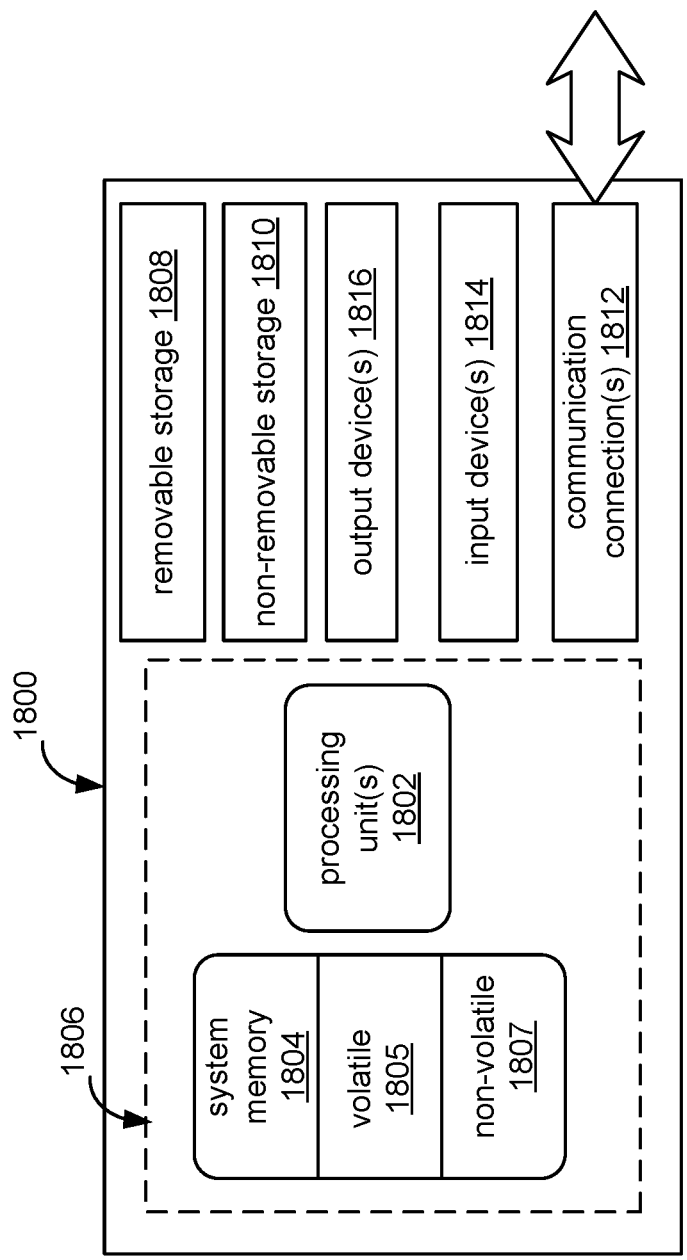
FIG. 9 illustrates is a block diagram of one embodiment of a network accessible computing device.

FIG. 9 is a block diagram of one embodiment of a computing device 107 which may host at least some of the software components illustrated in FIGS. 1 and 3-5A-B. In its most basic configuration, computing device 1800 typically includes one or more processing units 1802 including one or more CPUs and one or more GPUs. Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 9 by dashed line 1806. Additionally, device 1800 may also have additional features/functionality. For example, device 1800 may also include additional storage (removable and/or non-removable) including, but not limited to, magnetic or optical discs or tape. Such additional storage is illustrated in FIG. 9 by removable storage 1808 and non-removable storage 1810.

Device 1800 may also contain communications connection(s) 1812 such as one or more network interfaces and transceivers that allow the device to communicate with other devices. Device 1800 may also have input device(s) 1814 such as keyboard, mouse, pen, voice input device, touch input device, gesture input device, etc. Output device(s) 1816 such as a display, speakers, printer, etc. may also be included. These devices are well known in the art so they are not discussed at length here.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

The invention claimed is:

1. A method comprising:
 receiving data comprising video data representing a video and attribute data comprising a quality indicator value inserted into the video data during encoding of the video;
 determining one or more inputs to a first application for reducing noise in the video, the one or more inputs derived from at least the quality indicator value;

selecting at least a first input of the one or more inputs to be input into the first application to reduce noise in the video;

sending the at least first input to the first application, the first application operative to reduce noise in the video based on the at least first input; and sending at least a second input to a second application to enhance detail in the video, wherein the second input is based on at least the first input of the one or more inputs derived from at least the quality indicator value, the second application other than an application for reducing noise.

2. The method of claim 1, wherein the first application is selected from one of a mosquito noise reduction, block noise reduction, temporal noise reduction, random noise and banding reduction.

3. The method of claim 1, wherein the video is selected from a streaming video having a multi-bit rate and a streaming video having different bit rates during different fragments of the video.

4. The method of claim 1, wherein the first application is included in a plurality of applications and wherein selecting at least the first input includes selecting a different input to be input into a different application to reduce a different type of noise in the video.

5. The method of claim 1, wherein the selecting and sending occur after a predetermined fragment of the video data is received.

6. The method of claim 1, wherein receiving the attribute data comprises receiving at least two of the quality indicator value inserted during encoding of the video, a frame rate and a bit rate of the video.

7. A computing device, comprising:
one or more processors; and
one or more processor readable storage memories holding instructions executable by the one or more processors to:
receive data comprising video data representing a video and attribute data comprising a quality indicator value inserted into the video data during encoding of the video;
determine one or more inputs to a first application for reducing noise in the video, the one or more inputs derived from at least the quality indicator value;
select at least a first input of the one or more inputs to be input into the first application to reduce noise in the video;
send the at least first input to the first application, the first application operative to reduce noise in the video based on the at least first input; and
send at least a second input to a second application to enhance detail in the video, wherein the second input is based on at least the first input of the one or more inputs derived from at least the quality indicator value, the second application other than an application for reducing noise.

8. The computing device of claim 7, wherein the first application is selected from one of a mosquito noise reduction, block noise reduction, temporal noise reduction, random noise and banding reduction.

9. The computing device of claim 7, wherein the video is selected from a streaming video having a multi-bit rate and a streaming video having different bit rates during different fragments of the video.

10. The computing device of claim 7, wherein the first application is included in a plurality of applications and wherein selecting at least the first input includes selecting a different input to be input into a different application to reduce a different type of noise in the video.

11. The computing device of claim 7, wherein the selecting and sending occur after a predetermined fragment of the video data is received.

12. The computing device of claim 7, wherein receiving the attribute data comprises receiving at least two of the quality indicator value inserted during encoding of the video, a frame rate and a bit rate of the video.

13. A method comprising:
receiving data comprising video data representing a video;
receiving attribute data representing at least one attribute of the video, the attribute data comprising a quality indicator value inserted into the video data during encoding of the video and at least one of a frame rate and a bit rate of the video;
determining one or more inputs to a first application for reducing noise in the video, the one or more inputs derived from the quality indicator value and at least one of the frame rate and the bit rate of the video;
selecting at least a first input of the one or more inputs to be input into the first application to reduce noise in the video;
sending the at least first input to the first application, the first application operative to reduce noise in the video based on the at least first input; and
sending at least a second input to a second application to enhance detail in the video, wherein the second input is based on at least the first input of the one or more inputs derived from at least the quality indicator value, the second application other than an application for reducing noise.

14. The method of claim 13, wherein the first application is selected from one of a mosquito noise reduction, block noise reduction, temporal noise reduction, random noise and banding reduction.

15. The method of claim 13, wherein the video is selected from a streaming video having a multi-bit rate and a streaming video having different bit rates during different fragments of the video.

16. The method of claim 13, wherein the first application is included in a plurality of applications and wherein selecting at least the first input includes selecting a different input of the one or more inputs to be input into a different application to reduce a different type of noise in the video than the first application.

17. The method of claim 13, wherein the selecting and sending occur after a predetermined fragment of the video data is received.

* * * * *